United States Patent
Beraud et al.

(10) Patent No.: US 10,078,401 B2
(45) Date of Patent: Sep. 18, 2018

(54) CONTROL AND DISPLAY MODULE FOR A MOTOR VEHICLE HAVING A CAPACITIVE TOUCHPAD

(71) Applicant: Valeo Systemes Thermiques, Le Mesnil Saint Denis (FR)

(72) Inventors: Henry Beraud, Vincennes (FR); Tan Duc Huynh, Neuilly sur Marne (FR); Patrick Corduan, Guignes (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 14/355,694

(22) PCT Filed: Oct. 30, 2012

(86) PCT No.: PCT/FR2012/000442
§ 371 (c)(1),
(2) Date: May 1, 2014

(87) PCT Pub. No.: WO2013/064757
PCT Pub. Date: May 10, 2013

(65) Prior Publication Data
US 2014/0285471 A1    Sep. 25, 2014

(30) Foreign Application Priority Data

Nov. 3, 2011 (FR) .................... 11 03338

(51) Int. Cl.
*G06F 3/044* (2006.01)
*B60K 35/00* (2006.01)
(Continued)

(52) U.S. Cl.
CPC .............. *G06F 3/044* (2013.01); *B60K 35/00* (2013.01); *B60K 37/06* (2013.01); *G06F 1/1601* (2013.01);
(Continued)

(58) Field of Classification Search
CPC ...... G06F 3/044; G06F 1/1601; G06F 1/1627; G06F 2200/1633; B60K 35/00
See application file for complete search history.

(56) References Cited

U.S. PATENT DOCUMENTS

2003/0174128 A1   9/2003  Matsufusa
2006/0097991 A1*  5/2006  Hotelling .............. G06F 3/0416
                                                 345/173
(Continued)

FOREIGN PATENT DOCUMENTS

EP    2 345 953 A2    7/2011
WO   2011/053742 A2   5/2011
WO   2011/083215 A1   7/2011

OTHER PUBLICATIONS

ATMEL, Touch Sensor Design Guide, Apr. 2009, Revision D, p. 14-16, http://www.farnell.com/datasheets/1504633.pdf.*

(Continued)

*Primary Examiner* — Lisa Landis
(74) *Attorney, Agent, or Firm* — Osha Liang LLP

(57) ABSTRACT

The invention relates to a control and display module for a motor vehicle, comprising a screen (2), a capacitive touch panel (3) on top of the screen (2) and a frame (7) surrounding the capacitive touch panel (3) and having one edge (8) overlapping a peripheral edge of said panel (3), thereby forming a cavity between the capacitive touch panel (3) and the frame (7). The module is characterized in that it comprises a glass plate (9) glued to the capacitive touch panel (3), closing the cavity in order to reduce at least partially the difference between the levels of the capacitive touch panel (3) and the upper surface of the frame (7).

15 Claims, 1 Drawing Sheet

Figure 1:
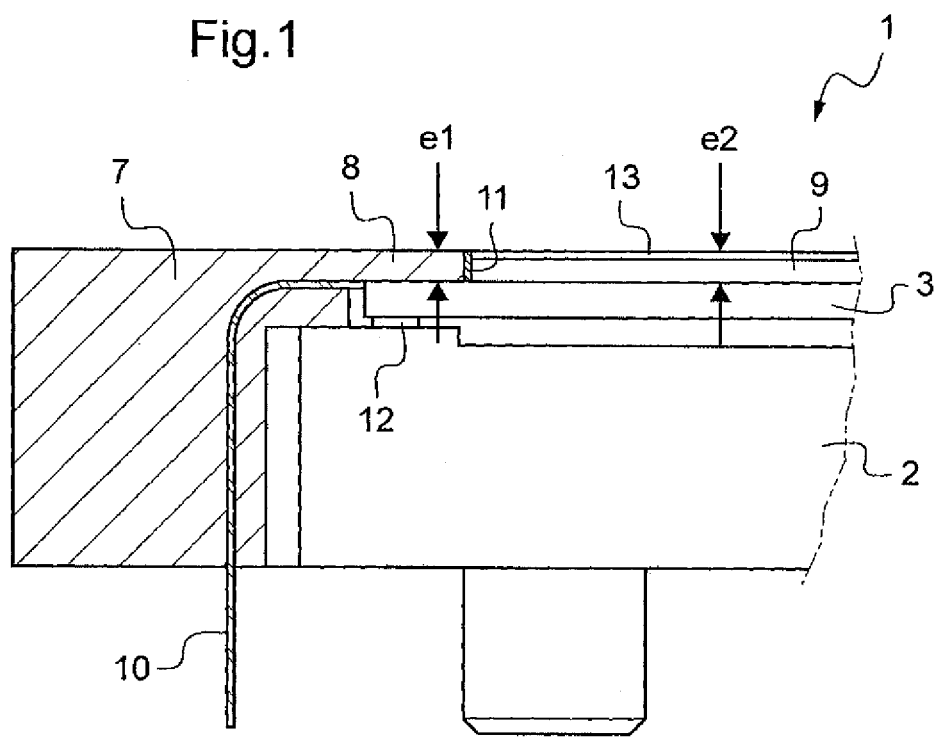

(51) Int. Cl.
*B60K 37/06* (2006.01)
*G06F 1/16* (2006.01)
(52) U.S. Cl.
CPC ............... *B60K 2350/1012* (2013.01); *B60K 2350/1028* (2013.01); *B60K 2350/2086* (2013.01)

(56) References Cited

U.S. PATENT DOCUMENTS

| | | | |
|---|---|---|---|
| 2006/0181841 A1* | 8/2006 | Chen | H04M 1/0266 361/679.3 |
| 2006/0232915 A1* | 10/2006 | Chou et al. | 361/681 |
| 2007/0152983 A1 | 7/2007 | McKillop et al. | |
| 2010/0220065 A1* | 9/2010 | Ma | G06F 3/016 345/173 |
| 2011/0019123 A1* | 1/2011 | Prest | C03C 19/00 349/58 |
| 2011/0148811 A1* | 6/2011 | Kanehira | G06F 3/044 345/174 |
| 2011/0279961 A1* | 11/2011 | Shedletsky | F16F 7/1028 361/679.21 |

OTHER PUBLICATIONS

International Search Report for corresponding International Application No. PCT/FR2012/000442, dated Mar. 20, 2013 (3 pages).

* cited by examiner

CONTROL AND DISPLAY MODULE FOR A MOTOR VEHICLE HAVING A CAPACITIVE TOUCHPAD

The present invention relates to a control and display module for a motor vehicle, comprising a capacitive touchpad and a screen to the rear of said pad. More precisely, such a module finds an advantageous application to the controls situated in the vicinity of the driver, on the dashboard or the front console of a motor vehicle, for example for controlling air-conditioning functions, an audio system, a telephony system, a multimedia system or else a navigation system.

Motor vehicle control and display devices comprise a screen for displaying information or control data. These screens may be covered with a transparent touchpad enabling input of commands by users of the vehicle. The touchpad makes it possible to determine the coordinates of the touch of a user's finger by using, for example, capacitive technology.

Touchpads are thin and fragile elements which lead to the appearance of projecting edges which need to be protected and concealed. For that, frames are arranged right around the touchpads, hiding the edges by forming a border in relief delimiting a cavity between the capacitive touchpad and the frame. The display screen then appears set back from the border of the frame.

However, motor vehicle manufacturers are now seeking to render vehicle façades more ergonomic and esthetic for the user by proposing control and display modules of smooth appearance and uniform feel.

The invention therefore proposes a control and display module for a motor vehicle which makes it possible to obtain a façade of smooth appearance and uniform feel.

Accordingly, the subject of the present invention is a control and display module for a motor vehicle, comprising a screen, a capacitive touchpad on top of said screen and a frame surrounding said capacitive touchpad and of which a border overlaps a peripheral edge of said capacitive touchpad while delimiting a cavity between said capacitive touchpad and said frame, characterized in that the control and display module comprises a glass plate adhesively bonded to said capacitive touchpad, filling said cavity at least partially in order to compensate for the difference in level between the capacitive touchpad and the upper surface of the frame.

According to one or more features of the control and display module taken alone or in combination,
- the control and display module comprises an antireflection and scratchproof polarizing film covering said glass plate,
- the difference between the thickness of the border of the frame and the thickness of the glass plate and of the polarizing film is less than or equal to 0.2 millimeter,
- the thickness of the glass plate is of the order of 1.6 millimeters, the thickness of the border is of the order of 2 millimeters and the thickness of the polarizing film is of the order of 0.2 millimeter,
- the control and display module comprises a first seal interposed between the border and the glass plate,
- the control and display module comprises a second seal interposed between the capacitive touchpad and the screen,
- the cross section of the border of the frame has a rounded wall,
- the radius of curvature of the rounded wall is of the order of 0.2 millimeters,
- the frame comprises a polycarbonate material or a PMMA material, the frame is molded.

The glass plate fills the cavity left by the frame, thus compensating at least partially for the difference in level between the capacitive touchpad and the frame, such that, visually and in terms of touch, the user perceives only a surface which is smooth and of uniform feel, without roughness or bulging, with the sliding of a finger on the boundary between the glass plate and the frame not being perceptible.

Moreover, the glass plate improves the sensitivity of the capacitive detection of the touchpad situated below, the dielectric constant of the glass being approximately three times higher than an element made of plastic could have been.

In addition to its filling function and its function of improving the capacitive detection, the glass plate makes it possible to protect the capacitive touchpad.

Figure 2:
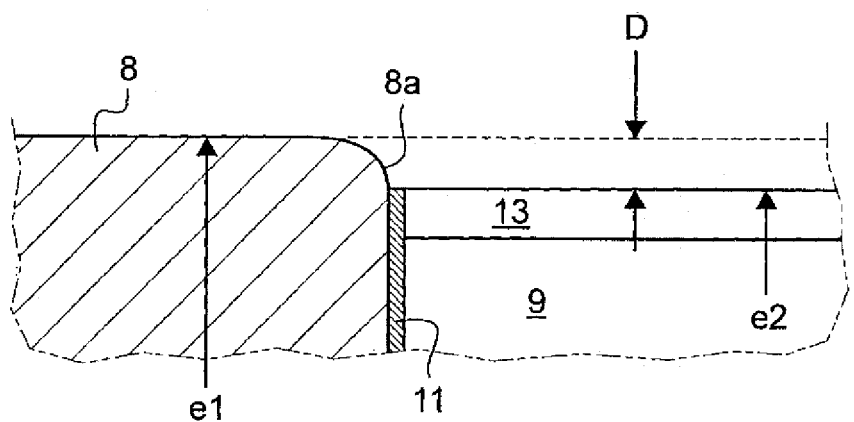

Other features and advantages of the invention will become apparent from the following description, given by way of nonlimiting example, with reference to the appended drawings in which:

FIG. 1 represents a schematic side view in section of a first exemplary embodiment of a control and display module, and FIG. 2 represents a side view in section of a detail of a second exemplary embodiment of a control and display module.

In these figures, identical elements bear the same reference numbers.

A first example of a control and display module 1 for a motor vehicle has been represented in FIG. 1.

This control and display module 1 can be fixed in the vicinity of the user, for example on the central console of the vehicle or on the dashboard (not shown) in order, for example, to control air-conditioning functions, an audio system, a telephony system, a multimedia system or else a navigation system.

The control and display module 1 comprises a screen 2 for displaying information or control data, a capacitive touchpad 3 on top of the screen 2 for the input of commands by a user, and a frame 7 surrounding the capacitive touchpad 3.

The capacitive touchpad 3 is transparent so as to be placed on the screen 2 and serve as input means. The capacitive touchpad 3 is made of glass and comprises, for example, an ITO (indium tin oxide) material, such as thin layer material, allowing both good electrical conductivity and optical transparency.

The capacitive touchpad 3 determines the coordinates of the point where the user presses with his finger on the control surface. The movement or the pressing of a user's finger causes the creation of a signal varying with the location and the movement of his finger in contact with and along the extent of this surface.

The screen 2 comprises, for example, a thin film transistor (TFT) display.

The screen 2 and the capacitive touchpad 3 thus allow the input of commands and the display of corresponding data.

The frame 7 which surrounds the capacitive touchpad 3 can also house the screen 2. The opening of the frame 7 has a profile provided with a border 8 projecting toward the center of the opening of the frame 7, which overlaps the capacitive touchpad 3 on a peripheral edge of the capacitive touchpad 3, thus delimiting a cavity above the capacitive touchpad 3, between the capacitive touchpad 3 and the end of the border 8 of the frame 7.

The profile of the frame 7 comprising the border 8 has, for example, an "L" shape cooperating with the capacitive touchpad 3 in order to retain it.

The control and display module 1 additionally comprises a glass plate 9 (or coverlay glass) adhesively bonded to the capacitive touchpad 3 by a liquid optical adhesive.

The glass plate 9 is transparent and has a volume adapted to fill at least partially the cavity left by the frame 7 and thus compensate for the difference in level between the height of the capacitive touchpad 3 and the height of the frame 7.

The glass plate 9 can completely compensate for the difference in level between the upper surface of the border 8 and the capacitive touchpad 3, thus placing the upper surface of the frame 7 and the glass plate 9 at the same level.

The glass plate 9 can additionally compensate in part for the difference in level, leaving a small volume to arrange a film, such as an antireflection polarizing film 13, and also a set-back volume to prevent the extraction of the film. The remaining difference in level between the upper surface of the film and the upper surface of the border 8 is minimal, that is to say that it is less than or of the order of 0.2 millimeter.

The glass plate 9 thus has a smaller area than that of the capacitive touchpad 3 such that the cross section of the assembly formed by the attachment of the glass plate 9 and of the capacitive touchpad 3 has an inverted "T" shape which is inserted below the border 8 of the frame 7.

Thus, the frame 7 protects and hides the peripheral edges of the capacitive touchpad 3 and the glass plate 9 aligns the height of the frame 7 such that the user perceives only a surface which is smooth and of uniform feel, without roughness or bulging, with the sliding of a finger on the boundary between the glass plate 9 and the frame 7 not being perceptible.

Moreover, the glass plate 9 improves the sensitivity of the capacitive detection of the touchpad 3 situated below, the dielectric constant of the glass being approximately three times higher than an element made of plastic could have been.

In addition to its filling function and function of improving the capacitive detection, the glass plate 9 also makes it possible to protect the capacitive touchpad 3.

The frame 7 is, for example, made of polycarbonate material or a PMMA (polymethyl methacrylate) material.

The frame 7 may comprise decorated zones obtained, for example, by a painting method with or without laser scratching, or by in mold decoration (IMD ink transfer technology).

The frame 7 may also comprise zones adapted to be backlit. Backlighting makes it possible to give information to the driver when driving at day or at night, giving the illusion that they are completely integrated into the module 1, without detracting from the smooth and uniform appearance of the façade.

The frame 7 is, for example, molded. It is thus possible to provide that the cross section of the profile of the border 8 of the frame 7 has a rounded wall 8a as represented in FIG. 2. The rounded border 8a is easier to obtain by molding and has a more attractive esthetic appearance.

It is also possible to provide that the frame 7 comprises metal inserts in the molding of the frame 7, in order to stiffen the control façade of the module 1.

Furthermore, the control and display module 1 comprises a flexible ribbon connector 10 (FIG. 1) allowing the routing of the electrical supply and output cables of the capacitive touchpad 3. The "technical" part of the module 1 is thus concealed by the frame 7.

Moreover, it is also possible to provide that the control and display module 1 comprises a first seal 11, such as a silicone seal, interposed between the border 8 and the glass plate 9 in order to ensure sealing of the module 1 and prevent the ingress of impurities such as dusts and liquids between the glass plate 9 and the frame 7 or to prevent electrostatic discharges.

The control and display module 1 may also comprise a second seal 12, such as an elastomer seal, in the form of a frame, interposed between the screen 2 and the capacitive touchpad 3. The second seal 12 in compression stresses the capacitive touchpad 3 against the border 8 of the frame 7. It additionally makes it possible to absorb the dimensional variations between the various elements of the module 1 and to protect the control façade against dusts and liquids.

The control and display module 1 may also comprise an antireflection polarizing film 13, such as an antiglare and scratchproof filth, covering the glass plate 9. The polarizing film 13 makes it possible to limit scratches, brightness effects and also fingerprints.

It is thus provided that the difference D between the thickness e1 of the border 8 of the frame 7 and thickness e2 of the glass plate 9 and of the polarizing film 13 is of the order of 0.2 millimeter. This difference in level is minimal and is not visually perceptible. By contrast, by providing that the polarizing film 13 is slightly set back from the border 8 of the frame 7, the edges of the polarizing film 13 are made more difficult to access, thereby making it possible to prevent said film from being extracted.

The thickness of the glass plate 9 is thus, for example, of the order of 1.6 millimeters and the thickness of the polarizing film is of the order of 0.2 millimeter whereas the thickness e1 of the border 8 is of the order of 2 millimeters. It is also provided that the radius of curvature of the rounded wall 8a of the border 8 is of the order of 0.2 millimeter.

The glass plate 9 thus makes it possible to have a surface with a smooth feel, to improve the sensitivity and the performance of the capacitive detection of the touchpad 3 and to protect the capacitive touchpad 3.

The invention claimed is:

1. A control and display module for a motor vehicle, comprising:
   a screen;
   a capacitive touchpad disposed on top of the screen;
   a frame surrounding the capacitive touchpad, wherein a border of the frame overlaps a peripheral edge of the capacitive touchpad and delimits a cavity formed above the capacitive touchpad and within the border of the frame;
   a glass plate disposed in the cavity,
      wherein a bottom surface of the glass plate is adhesively bonded to a top surface of the capacitive touchpad,
      wherein a gap, surrounding the glass plate, is formed between edges of the glass plate and the border of the frame, in the cavity;
   a first seal disposed in the gap, between the border and the edges of the glass plate, in the cavity; and
   a second seal interposed between the capacitive touchpad and the screen,
   wherein the second seal is electrically non-conductive and configured to absorb dimensional variations of elements of the control and display module,
   wherein a first surface of the second seal is in mechanical contact with the capacitive touchpad and a second surface of the second seal, opposing the first surface, is in mechanical contact with the screen, and
   wherein the first surface and the second surface of the second seal are not in electrical contact with the capacitive touchpad and the screen.

2. The control and display module as claimed in claim 1, further comprising an antireflection and scratchproof polarizing film covering the glass plate.

3. The control and display module as claimed in claim 2, wherein a difference between a thickness of the border of the frame and a thickness of the glass plate and of the polarizing film is less than or equal to 0.2 millimeters.

4. The control and display module as claimed in claim 3, wherein the thickness of the glass plate is 1.6 millimeter, the thickness of the border is 2 millimeters and the thickness of the polarizing film is 0.2 millimeter.

5. The control and display module as claimed in claim 3, wherein the cross section of the border of the frame has a rounded wall.

6. The control and display module as claimed in claim 5, wherein the radius of curvature of the rounded wall is 0.2 millimeter.

7. The control and display module as claimed in claim 1, wherein the frame comprises a polycarbonate material or a PMMA material.

8. The control and display module as claimed in claim 7, wherein the frame is molded.

9. The control and display module as claimed in claim 1, wherein the glass plate has a dielectric constant substantially higher than plastic, which improves the sensitivity of the capacitive detection of the capacitive touchpad positioned below the glass plate.

10. The control and display module as claimed in claim 1, wherein sliding of a finger on a boundary between the glass plate and the frame is not perceptible.

11. The control and display module as claimed in claim 1, wherein a profile of the frame comprising the border has an "L" shape cooperating with the capacitive touchpad in order to retain the capacitive touchpad.

12. The control and display module as claimed in claim 1, wherein the glass plate comprises a smaller area than that of the capacitive touchpad, such that a cross section of the assembly formed by the attachment of the glass plate and of the capacitive touchpad has an inverted "T" shape which is inserted below the border of the frame.

13. The control and display module as claimed in claim 1, wherein the frame comprises at least one zone configured to be backlit so as to give information to a driver of the motor vehicle.

14. The control and display module as claimed in claim 1, wherein the first seal is a silicon seal, and the second seal is an elastomer seal, and wherein the second seal in compressions stresses the capacitive touchpad against the border of the frame.

15. The control and display module as claimed in claim 1, further comprising a flexible ribbon connector for allowing routing of an electrical supply and output cables of the capacitive touchpad, wherein the flexible ribbon connector is concealed by the frame.

* * * * *